No. 736,943. PATENTED AUG. 25, 1903.
L. DENAYROUZE.
INCANDESCENT LAMP.
APPLICATION FILED APR. 12, 1902.

NO MODEL.

WITNESSES:
René Peruine
Thomas F. Wallace

INVENTOR:
Louis Denayrouze
By Attorneys,
Arthur E. Fraser

THE NORRIS PETERS CO., PHOTO-LITHO., WASHINGTON, D. C.

No. 736,943. Patented August 25, 1903.

UNITED STATES PATENT OFFICE.

LOUIS DENAYROUZE, OF NEUILLY-SUR-SEINE, FRANCE, ASSIGNOR TO CENTRAL LIGHTING COMPANY, OF NEW YORK, N. Y., A CORPORATION OF NEW JERSEY.

INCANDESCENT LAMP.

SPECIFICATION forming part of Letters Patent No. 736,943, dated August 25, 1903.

Application filed April 12, 1902. Serial No. 102,547. (No model.)

*To all whom it may concern:*

Be it known that I, LOUIS DENAYROUZE, a citizen of the Republic of France, residing in Neuilly-sur-Seine, France, have invented certain new and useful Improvements in Incandescent Lamps, of which the following is a specification.

In Letters Patent No. 684,921, granted to me October 22, 1901, I have described a lamp for use with refractory mantles in which I use one or more mixers, which may be ordinary Bunsen burners, with a chamber located above and communicating with said mixers, a screen closing the top of such chamber, and a draft-tube passing through said chamber and admitting air within the mantle. My present invention is applicable to lamps of the type described in said patent, but is not necessarily limited to this type of lamps, and has for its object principally to effect a very thorough mixture of gas and air and to provide a very strong and at the same time cheap construction.

My invention also provides various improvements in detail, as hereinafter specified.

Figure 1:
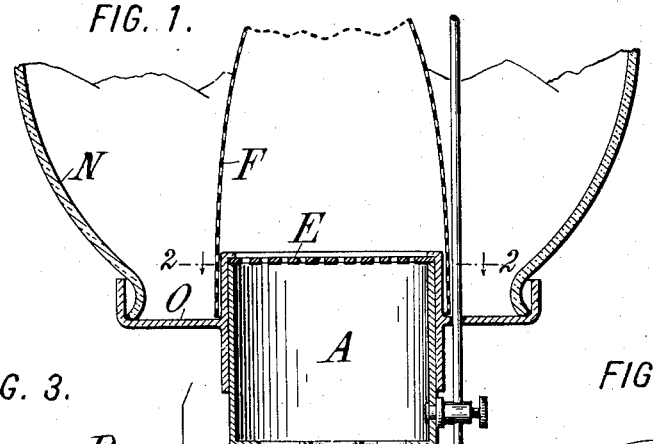
Figure 3:
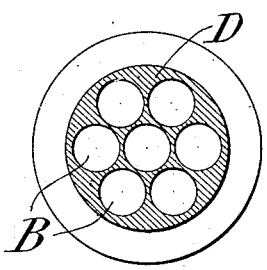
Figure 4:
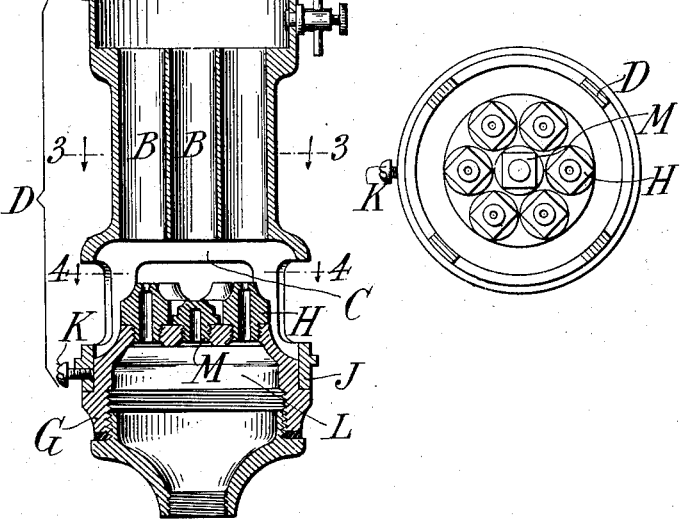
Figure 2:
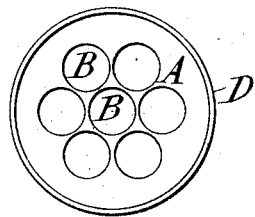

Referring to the accompanying drawings, illustrating an embodiment of my invention, Figure 1 is a central section through the complete burner. Fig. 2 is a plan thereof at the plane indicated by the line 2 2 of Fig. 1, omitting the mantle and globe holder. Fig. 3 is a horizontal section on the line 3 3 of Fig. 1. Fig. 4 is a horizontal section on the line 4 4 of Fig. 1.

A point of improvement over the construction in my patent above referred to is the arrangement of the draft-tube so that it discharges direct into the mixing-chamber instead of passing through the same. Another point of improvement is the formation of the group of mixers or tubes, terminating at their lower ends in a common open chamber, in which chamber there are gas-nozzles arranged to direct jets of gas into such tubes. The mixers, including the mixing-tubes and the corresponding gas-nozzles, are preferably arranged in an annular group, and the draft-tube is arranged centrally thereof and also terminates at its lower end in the open chamber. Simplicity of construction is secured by forming the burner of two members, the upper one of which includes the upper mixing-chamber, the lower open chamber, and the mixing and draft tubes communicating at their lower ends with the open chamber and discharging at their upper ends into the mixing-chamber, while the second member carries the gas-nozzles and is adapted to be connected to the first-mentioned member, with the nozzles in the open chamber in their proper position in line with the tubes.

Referring to the accompanying drawings, A indicates the mixing-chamber; B B, the mixing and draft tubes, which in the embodiment illustrated are identical except as to position, the mixing-tubes being arranged in an annular group with the draft-tube in the center.

C is an open chamber which communicates with each of the tubes B and into which air is admitted in any suitable way, preferably by constructing the chamber in the form of a cage with openings of suitable size in its walls. Preferably, as shown, the elements referred to are comprised in a single integral member D, at the upper end of which is placed the screen E beneath the mantle F and the lower end of which is adapted for attachment to the member G, which carries gas-nozzles H. The lower ring J of the member D preferably fits over and rests upon a shoulder of the member G and after being set with the nozzles H in line with the mixing-tubes B is fastened thereto, as by a set-screw K. The member G includes a gas-chamber L and is provided with a single admission-opening adapted for attachment to a source of supply such as is found in the ordinary chandelier or gas-lamp. At the upper portion of the chamber L are a plurality of discharge-openings, and in order to utilize as many or as few of these as desirable I arrange for the detachable connection of removable nozzles H (one or more) and also of removable plugs M, (one or more.) The effect of substituting a plug M for a nozzle H is merely to convert the tube B in line with such plug into a draft-tube instead of a mixing-tube. In the burner shown I purpose under ordinary conditions of supply to arrange the nozzles in an annulus, as shown in Fig. 4, with a single plug M at the center; but by the improved construction described I am enabled to vary this arrangement at will. The detachable nozzles are also most easily cleaned.

My improvements as above described are adapted for use with any of the ordinary chimneys or globes. Preferably I arrange a globe N upon a closed rim or socket O, which is connected to the shell of the mixing-chamber A. By this construction no air is permitted to enter within the globe except through the open chamber C at the bottom of the burner and through the flame. Hence the draft is made very effective to draw in air through the mixing-tubes and through the draft-tube.

In operation the gas passes through the gas-chamber L and the nozzles H in small jets, which pass up through the corresponding tubes B, carrying with them a suitable quantity of air from the open chamber C, and discharge into the mixing-chamber A, in which they are all completely mixed before passing through the screen E to the flame within the mantle F. Air passes also through the central draft-tube B into the center of the mixing-chamber A, so as to mix to some extent with the gas and air therein and so as also to admit air to the interior of the flame above the screen, so as to press the flame out against the mantle in the manner described in my aforesaid patent.

Though I have described with great particularity of detail an apparatus embodying my invention, yet it is to be understood that the invention is not limited to the specific form shown and described, since various modifications of the details and arrangements of the parts are possible to those skilled in the art without departure from the invention. For example, it is preferred to make the mixing-chamber A of a greater height than that which would be assumed by the blue cores of flames issuing from the mixing-tubes B, as explained in my aforesaid patent; but some of the features of my improved burner are independent of the mixing-chamber A. Also though I prefer to use removable nozzles H, so that they may be easily removed and thoroughly cleaned and may be arranged in any desired grouping in connection with removable plugs, yet this construction is not essential to the other features of improvement.

The nozzles H virtually form part of that portion of the member G which forms the gas-chamber L and constitute outlets for said chamber. I also desire to call attention to the fact that the mixing-tubes B do not rest directly on the gas-chamber, and therefore do not carry the weight of the entire superstructure; but these tubes are contained within the shell D, which therefore becomes the supporting member.

What I claim is—

1. In a gas-burner, a casing consisting of a solid body having in its interior a series of longitudinal channels forming a cluster of mixing-tubes, which cluster is surrounded by said casing, the said channels being open to the atmosphere at one end, and means for discharging jets of gas into the open ends of said tubes.

2. The combination of a group of mixers comprising tubes terminating at their lower ends in a common open chamber, and gas-nozzles in said chamber arranged to direct jets of gas into said tubes, the discharge ends of said nozzles being located below the lower ends of said tubes and below the upper edges of the openings by which said chamber communicates with the outside air.

3. The combination of a group of mixers comprising tubes terminating at their lower ends in a common open chamber, gas-nozzles in said chamber arranged to direct jets of gas into said tubes, a mixing-chamber located above and communicating with said mixers, a draft-tube discharging into said mixing-chamber, and a screen closing the top of said mixing-chamber.

4. The combination with an annular group of mixers comprising tubes terminating at their lower ends in a common open chamber, and gas-nozzles in said chamber arranged to direct jets of gas into said tubes, of a mixing-chamber located above and communicating with said mixer-tubes, a central draft-tube terminating at its lower end in said open chamber and discharging into said mixing-chamber, and a screen closing the top of said mixing-chamber.

5. The combination with a member comprising an upper mixing-chamber, a lower open chamber, and tubes communicating at their lower ends with said open chamber and discharging at their upper ends into said mixing-chamber, of a second member carrying gas-nozzles and adapted to be connected to said first-mentioned member with said nozzles in said open chamber and in line with said tubes.

6. In a gas-burner, a casing consisting of a solid body having in its interior a series of longitudinal channels forming a cluster of mixing-tubes, which cluster is surrounded by said casing, the said channels being open to the atmosphere at one end, and a plurality of means, the number of which is smaller than that of the said channels, for discharging jets of gas into the open ends of sundry of the said channels.

7. The combination with a gas-chamber having a single admission-opening adapted for attachment to a source of supply and having a plurality of discharge-openings, of removable nozzles and removable plugs detachably attached to said chamber at said discharge-openings.

8. In a gas-burner, comprising a casing having three portions, viz: a lower chamber open to the atmosphere, an upper mixing-chamber open to the burner proper, and an intermediate portion having longitudinal channels connecting the said two chambers, in combination with means, extending into said lower chamber, for discharging jets of gas into the open lower ends of said channels, the discharge ends of said means being located within said lower chamber at a distance below the lower ends of said channels, and below the upper edges of the openings by which said lower chamber communicates with the outside air.

9. The gas-chamber provided with one or more outlets combined with a shell resting on the gas-chamber and containing tubes at a distance from said outlets and out of contact therewith.

10. The gas-chamber provided with one or more outlets, combined with the shell containing a plurality of tubes out of contact with the gas-chamber and some of them in alinement with said outlets, while one or more of said tubes are out of alinement with the outlets, the said shell resting on the gas-chamber.

In witness whereof I have hereunto signed my name in the presence of two subscribing witnesses.

LOUIS DENAYROUZE.

Witnesses:
MARCEL ARMENGAUD,
EDWARD P. MACLEAN.